(12) United States Patent
Song et al.

(10) Patent No.: US 10,149,247 B2
(45) Date of Patent: Dec. 4, 2018

(54) FAST DORMANCY SYSTEM AND PROCESS

(71) Applicant: QUALCOMM Incorporated, San Diego, CA (US)

(72) Inventors: Bongyong Song, San Diego, CA (US); Yuheng Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/728,467

(22) Filed: Oct. 9, 2017

(65) Prior Publication Data

US 2018/0035381 A1 Feb. 1, 2018

Related U.S. Application Data

(63) Continuation of application No. 14/155,245, filed on Jan. 14, 2014, now Pat. No. 9,832,729.

(51) Int. Cl.
*H04W 52/02* (2009.01)
*H04W 76/27* (2018.01)

(52) U.S. Cl.
CPC ... *H04W 52/0251* (2013.01); *H04W 52/0225* (2013.01); *H04W 76/27* (2018.02); *Y02D 70/1242* (2018.01); *Y02D 70/1262* (2018.01)

(58) Field of Classification Search
CPC .............................. H04W 52/02; H04W 76/27
See application file for complete search history.

(56) References Cited

U.S. PATENT DOCUMENTS

| 8,504,002 | B2 | 8/2013 | Lenart et al. | |
|---|---|---|---|---|
| 2011/0319064 | A1* | 12/2011 | Lenart | H04W 52/0225 455/418 |
| 2012/0020393 | A1 | 1/2012 | Patil et al. | |
| 2012/0281561 | A1 | 11/2012 | Shukla et al. | |
| 2012/0320811 | A1 | 12/2012 | Islam et al. | |
| 2013/0242763 | A1 | 9/2013 | Li | |
| 2013/0267213 | A1 | 10/2013 | Hsu | |
| 2013/0272129 | A1 | 10/2013 | Prakash et al. | |

(Continued)

FOREIGN PATENT DOCUMENTS

| EP | 1981224 A1 | 10/2008 |
|---|---|---|
| EP | 2384081 A2 | 11/2011 |

(Continued)

OTHER PUBLICATIONS

International Search Report and Written Opinion—PCT/US2015/010369—ISA/EPO—dated Apr. 16, 2015.

(Continued)

*Primary Examiner* — Lakeram Jangbahadur
(74) *Attorney, Agent, or Firm* — Paradice and Li LLP (57) ABSTRACT

A communication system operates in the first power state during a communication session. The system transitions from the first to a second power state, when a first predefined time period expires after transfer of a packet and before a transfer of a next packet, for any of and no more than a first N packets in the communication session. Alternatively or in addition, the system transitions from the first to the second power state when: (a) the first predefined time period expires after transfer of a packet and before transfer of a next packet in the communication session and (b) the size of each packet transferred thus far in the communication session is not greater than S.

12 Claims, 4 Drawing Sheets

(56) References Cited

U.S. PATENT DOCUMENTS

| | | | |
|---|---|---|---|
| 2013/0279385 A1* | 10/2013 | Meylan | H04W 52/0225 |
| | | | 370/311 |
| 2014/0092767 A1 | 4/2014 | Park | |
| 2015/0071148 A1* | 3/2015 | Komatsu | H04W 8/22 |
| | | | 370/311 |
| 2015/0201378 A1 | 7/2015 | Song et al. | |

FOREIGN PATENT DOCUMENTS

| | | |
|---|---|---|
| GB | 2501931 A | 11/2013 |
| JP | 2013093798 A | 5/2013 |
| WO | WO-2013158794 A1 | 10/2013 |
| WO | 2013179830 A1 | 12/2013 |

OTHER PUBLICATIONS

Qian F., et al., "Profiling resource usage for mobile applications: a cross-layer approach," Proceedings of the 9th international conference on Mobile systems, applications, and services, 2011, pp. 321-334.

* cited by examiner

FAST DORMANCY SYSTEM AND PROCESS

CROSS-REFERENCE TO RELATED PATENT APPLICATION

This application is a Continuation of U.S. application Ser. No. 14/155,245, filed Jan. 14, 2014, which is incorporated herein by reference in its entirety.

BACKGROUND

Field

The present disclosure relates generally to communication systems and processes and more particularly, to communications systems and processes for fast dormancy to reduce tail overhead of radio connections that contain a small amount of data.

Background

In mobile telephone devices, radio connections that contain a relatively small amount of data (referred to herein as "tiny connections") occur in certain communication networks. Tiny connections can result in an inefficient usage of power in mobile user equipment (UE) and inefficient usage of network resources. Tiny connections can be caused by various events, for example, but not limited to, delayed TCP FIN packets, keep-alive messages, delayed/duplicated RST or ACK packets, and unwanted spurious packets initiated by networks, or other communication events.

Since tiny connections contain a very small amount of data (e.g., a relatively small number of packets, or one or more relatively small packets), the useful period of time for exchanging packets between the UE and the network is very small, followed by a relatively large period of time referred to as "tail overhead." Tail overhead is caused by the network inactivity timer. The network inactivity timer is configured to expire at a predefined time period following the end of each packet, unless another packet is communicated within that time period. During tail overhead, the UE stays on a high power state (e.g., CELL_DCH and CELL_FACH) while waiting for the network inactivity timer to expire, so that the UE can transition to a low power state (e.g., IDLE).

For example, a tiny connection with two seconds of traffic activity and eighteen seconds of network inactivity timer would suffer 90% tail overhead. Reliably shortening tail overhead can improve power usage efficiency in the UE and improve network efficiency by releasing radio resources earlier.

One proposal for shortening tail overhead is to identify a specific tiny connection type such as one for a delayed TCP SYN packet where the very first packet in a radio connection is a TCP SYN packet from the server which is followed by an uplink ACK packet. However, that proposal would be limited to only those tiny connections that are provided with such SYN and ACK packets.

Other proposals, such as described in U.S. Publ. No. 2012/0320811 to Islam et al. or in U.S. Publ. No. 2013/0242763 to Li, involve determining data transaction needs of an application running on a device, to determine if future network communications are likely. According to such proposals, a device can send a signal to release a radio connection when it determines that the application running on the device is finished with data transactions. However, such proposals do not address various different types of "tiny connections" that can occur in many network environments.

Other proposals, such as described in U.S. Pat. No. 8,504,002 to Lenart et al. have employed algorithms for transitioning a device to a different operating state, after an amount of time has lapsed in the absence of data traffic, but are not concerned with "tiny connections" in the first preset number N of packets of a communication session

SUMMARY

Embodiments of the present invention relate to systems and methods for reducing "tail overhead" for "tiny connections," by recognizing tiny connections, and initiating a relatively fast transition to a low power state in response to a detection of the end of the data transfer for each tiny connection.

According to an embodiment of the present invention, a method of controlling an electronic communication device having first and second power states comprises operating the electronic communication device in a first power state in a communication session; and requesting to the base station transitioning the electronic communication device from the first power state to the second power state in response to a determination that a first predefined time period has expired after transfer of a packet and before a transfer of a next packet, for any of and no more than a first N packets in the communication session.

A method, according to further embodiments, comprises detecting a connection increase rate and adjusting N based on the detected connection increase rate.

According to yet further embodiments, N is a number in the range of 2-12.

According to a further embodiment of the present invention, a method of controlling an electronic communication device having first and second power states comprises: operating the electronic communication device in a first power state in a communication session; and transitioning the electronic communication device from the first power state to the second power state in response to a determination that: (a) a first predefined time period has expired after transfer of a packet and before a transfer of a next packet in the communication session and (b) the size of each packet transferred thus far in the communication session is not determined to be greater than S.

A method, according to further examples of any of the above embodiment, comprises detecting a connection increase rate and adjusting S based on the detected connection increase rate.

According to yet further examples of any of the above embodiments, the first predefined time period is in the range of 3 to 5 seconds.

According to yet further examples of any of the above embodiments, S is a number in the range of 100-1000 bytes.

According to yet further examples of any of the above embodiments, transitioning comprises implementing a UMTS fast dormancy operation.

A method, according to further examples of any of the above embodiments, comprises determining whether the electronic communication device is in a screen OFF mode and maintaining the electronic communication device in the first power state in response to a determination that the communication device is not in the screen OFF mode.

A method, according to further examples of any of the above embodiments, comprises determining whether the electronic communication device is in an application processor power collapse mode and maintaining the electronic communication device in the first power state in response to a determination that the communication device is not in the application processor power collapse mode.

A communication system according to an embodiment of the present invention comprises an electronic communication device having at least first and second different power states, where the electronic communication device is configured to operate in the first power state during a communication session. The communication system also includes processing electronics in the electronic communication device, the processing electronics configured for requesting transitioning of the electronic communication device from the first power state to the second power state in response to a determination that a first predefined time period has expired after transfer of a packet and before a transfer of a next packet, for any of and no more than a first N packets in the communication session.

According to further embodiments of the above-described system the processing electronics is further configured to adjust N based on a detected connection increase rate.

According to further embodiments of the above-described system, the processing electronics is configured such that at least one of: (a) N is a number in the range of 2-12; (b) the first predefined time period is in the range of 3 to 5 seconds; and (c) transitioning comprises implementing a UMTS fast dormancy operation.

According to further embodiments of the above-described system, the processing electronics is further configured to at least one of: (a) determine whether the electronic communication device is in a screen OFF mode and maintain the electronic communication device in the first power state in response to a determination that the communication device is not in the screen OFF mode; and (b) determine whether the electronic communication device is in an application processor power collapse mode and maintaining the electronic communication device in the first power state in response to a determination that the communication device is not in the application processor power collapse mode.

A communication system according to a further embodiment of the present invention also comprises an electronic communication device having at least first and second different power states, the electronic communication device configured to operate in the first power state during a communication session. In the further embodiment, processing electronics in the electronic communication device is configured for transitioning the electronic communication device from the first power state to the second power state in response to a determination that: (a) a first predefined time period has expired after transfer of a packet and before a transfer of a next packet in the communication session and (b) the size of each packet transferred thus far in the communication session is not determined to be greater than S.

According to further embodiments of the above-described system, the processing electronics is configured such that at least one of: (a) the first predefined time period is in the range of 3 to 5 seconds; (b) S is in the range of 100-1000 bytes; and (c) transitioning comprises implementing a UMTS fast dormancy operation.

According to further embodiments of the above-described system, the processing electronics is further configured for at least one of: (a) determining whether the electronic communication device is in a screen OFF mode and maintaining the electronic communication device in the first power state in response to a determination that the communication device is not in the screen OFF mode; and (b) determining whether the electronic communication device is in an application processor power collapse mode and maintaining the electronic communication device in the first power state in response to a determination that the communication device is not in the application processor power collapse mode.

A communication system for controlling an electronic communication device having first and second power states according to a further embodiment of the present invention also comprises processing and communication means for operating the electronic communication device in a first power state in a communication session. The system further comprises further processing means for requesting to the base station transitioning the electronic communication device from the first power state to the second power state in response to a determination that a first predefined time period has expired after transfer of a packet and before a transfer of a next packet, for any of and no more than a first N packets in the communication session.

A communication system according to a further example of the above-described embodiment of the present invention also comprises means for determining a connection increase rate and adjusting N based on the detected connection increase rate.

According to further embodiments of the above-described system, the processing electronics is configured such that at least one of: (a) N is a number in the range of 2-12; (b) the first predefined time period is in the range of 3 to 5 seconds; and (c) transitioning comprises implementing a UMTS fast dormancy operation.

A communication system according to a further example of the above-described embodiment of the present invention also comprises means for determining whether the electronic communication device is in a screen OFF mode and maintaining the electronic communication device in the first power state in response to a determination that the communication device is not in the screen OFF mode.

A communication system according to a further example of the above-described embodiment of the present invention also comprises means for determining whether the electronic communication device is in an application processor power collapse mode and maintaining the electronic communication device in the first power state in response to a determination that the communication device is not in the application processor power collapse mode.

A communication system for controlling an electronic communication device having first and second power states according to a further embodiment of the present invention also comprises processing and communication means for operating the electronic communication device in a first power state in a communication session. The system further comprises further processing means for transitioning the electronic communication device from the first power state to the second power state in response to a determination that: (a) a first predefined time period has expired after transfer of a packet and before a transfer of a next packet in the communication session and (b) the size of each packet transferred thus far in the communication session is not determined to be greater than S.

According to further embodiments of the above-described system, the processing electronics is configured such that at last one of: (a) the first predefined time period is in the range of 3 to 5 seconds; (b) S is a number in the range of 100-1000 bytes; and (c) transitioning comprises implementing a UMTS fast dormancy operation.

A communication system according to a further example of the above-described embodiment of the present invention also comprises means for determining a connection increase rate and adjusting S based on the detected connection increase rate.

A communication system according to a further example of the above-described embodiment of the present invention also comprises means for determining whether the electronic communication device is in a screen OFF mode and maintaining the electronic communication device in the first power state in response to a determination that the communication device is not in the screen OFF mode.

A communication system according to a further example of the above-described embodiment of the present invention also comprises means for determining whether the electronic communication device is in an application processor power collapse mode and maintaining the electronic communication device in the first power state in response to a determination that the communication device is not in the application processor power collapse mode.

Further embodiments of the present invention comprise a computer program product for controlling an electronic communication device having first and second power states and that operates in a first power state during a communication session. The computer program comprises a computer-readable storage medium having code for transitioning the electronic communication device from the first power state to the second power state in response to a determination that a first predefined time period has expired after transfer of a packet and before a transfer of a next packet, for any of and no more than a first N packets in the communication session.

DETAILED DESCRIPTION OF EMBODIMENTS OF THE INVENTION

Embodiments of the present invention relate to systems and methods for reducing tail overhead for tiny connections, by reliably detecting the end of the data transfer within a tiny connection, and initiating a fast dormancy operation to transition a mobile user device, referred to herein as user equipment (UE) to a low power state faster than the expiry of network timers.

According to embodiments of the present invention, processing electronics within a UE, are configured to detect a tiny connection and, in particular embodiments, to detect the end of the data transfer of a tiny connection. The processing electronics are further configured to carry out a "tiny connection fast dormancy" (TCFD) process as described herein, upon the detection of the end of tiny connection. In particular embodiments, the TCFD process employs a UMTS "fast dormancy" feature already present in the UE. In other embodiments, the TCFD process employs other suitable fast dormancy features, such as described herein.

The TCFD process employs an inactivity timer that is more aggressive (shorter duration) than the network inactivity timer. For example, if the network inactivity timer is 18 seconds, the TCFD inactivity timer may be 3 to 5 seconds. In other embodiments, other suitable time periods for the TCFD inactivity timer are employed. By employing a suitably aggressive TCFD inactivity timer (with a sufficiently shorter time period than the network inactivity timer time period) and reliable detection of tiny connections, significant power savings and more efficient usage of network resources can be accomplished.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with "processing electronics" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

1. System Hardware Environment

Figure 1:
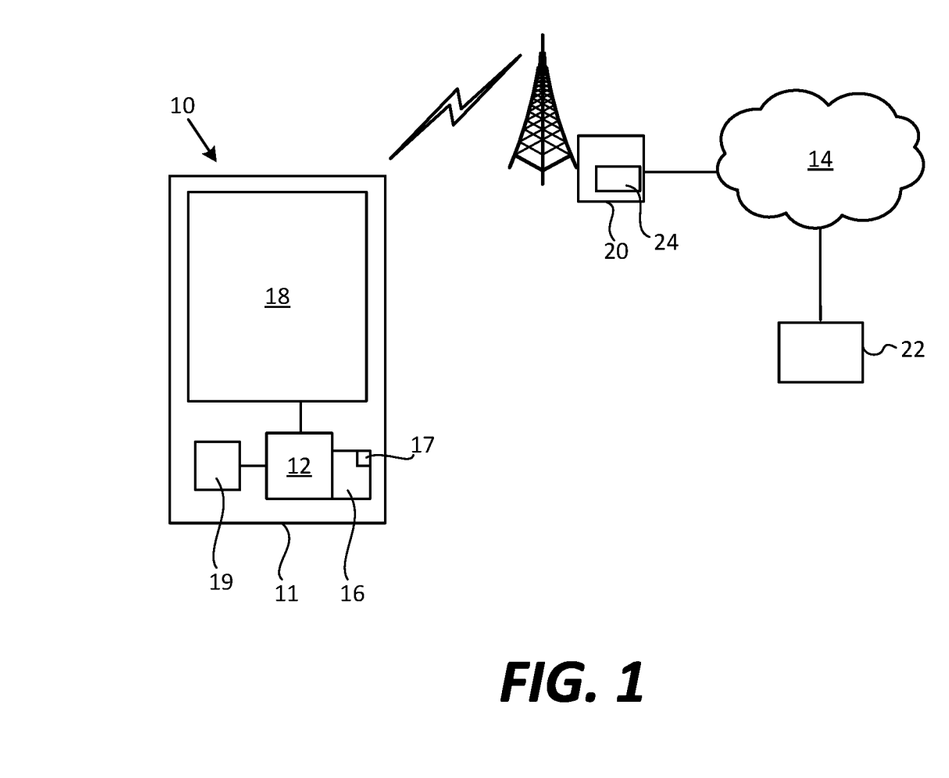
FIG. 1 is a diagram showing a system according to an embodiment of the present invention.

Examples of a TCFD system and process according to embodiments of the present invention are described with reference to FIG. 1. In FIG. 1, a UE 10 includes a housing 11 containing processing and communication electronics 12 configured to provide certain processing operations and network communication operations, for example, but not limited to wireless telecommunications over a network 14. As shown in FIG. 1, the UE 10 is also configured with TCFD processing electronics 16.

The processing and communication electronics 12 includes processing electronics and communication electronics configured to perform operations relating to network communications. In particular embodiments, the processing and communication electronics 12 are configured to provide standard radio telecommunication operations, and may be configured similar to conventional wireless telecommunication electronics, such as used in conventional wireless mobile telephones, electronic pads, smart phones, or the like. In other embodiments, the processing and communication electronics 12 may be specifically configured for one or more other wireless communication applications of use.

In certain embodiments, the processing and communication electronics 12 are also configured to perform other processing operations, based on software, hardware, firmware or combinations thereof, associated with the processing electronics, where such other operations may include, but are not limited to timer operations (to determine the expiration of one or more preset time periods), user interface operations (to control the display and input of information to and from a user), contact directory operations, and/or other applications conventionally included in wireless telecommunication devices.

In particular embodiments, the TCFD processing electronics 16 comprises software, hardware or combinations thereof, added to or included in the same processing and communication electronics 12. By incorporating the TCFD processing electronics within the processing and communication electronics 12 that are already provided in the UE 10 for network communication operations, the TCFD processing electronics 16 can be included in the UE 10, with minimal additional costs. In particular embodiments, the TCFD processing electronics 16 comprises software, such as one or more software applications, programs, modules, or other appropriate form, for programming processing electronics included in the processing and communication electronics 12, without requiring additional hardware to be included in the UE 10. However, in other embodiments, the TCFD processing electronics 16 comprises processing electronics that are separate from, but connected to operate with, the processing and communication electronics 12.

As described herein, the TCFD processing electronics 16 includes or operates with at least one TCFD timer 17 for providing a timing signal (e.g., a time out signal) upon the expiration of one or more predefined time periods from the start of the timer. The TCFD timer 17 may be implemented in software, hardware or combinations thereof, included in or operatively connected with the TCFD processing electronics 16 and/or the processing and communication electronics 12. The TCFD processing electronics 16 are configured to start the timer 17, reset the timer 17 and process timing signals from the timer 17, in accordance with examples as described herein. The TCFD timer 17 may be set to any suitable time period and, in particular embodiments, is set to a time period that is less than a network inactivity timer 24 (discussed below). For example, if the network inactivity timer is 18 seconds, the TCFD inactivity timer may be 3 to 5 seconds. In other embodiments, other suitable time periods for the TCFD inactivity timer 17 are employed.

The UE 10 in FIG. 1 also includes an electronic display screen and associated display electronics 18 in the housing 11. The display screen and electronics 18 are connected with the processing and communication electronics 12, and are configured for displaying visual display information. In particular embodiments, the electronics 12 and/or electronics 18 are configured to control the operation of the display screen to selectively transition between high and low power states (for example, for lighting, backlighting, sleep mode or other high and low power usage modes), for example, in response to control signals from the electronics 12 and/or electronics 18. The UE 10 may include one or more user input devices for receiving information from a user, where such user input devices may include a touch screen associated or included in the display screen 18, and/or one or more of buttons, knobs, keyboard keys, slide switches or the like (not shown) arranged on the housing of the UE 10.

The UE 10 includes or operates with a power source 19 for providing electronic power to the processing and communications electronics 12 and other electronics in the UE 10. In particular embodiments, the power source 19 comprises an internal power source such as a battery or other limited source that depletes over time and/or usage. In such embodiments, the TCFD processing can help to minimize power usage and increase the charged or working life of the power source 19.

The UE 10 may be any suitable electronic communication device having processing capabilities and that is configured to provide electronic network communication operations. In example embodiments, the UE 10 is a wireless, mobile telephone device or other electronic communication device that provides mobile telephone audio and/or text communication operations through radio connections with one or more base stations 20. Examples of such a UE 10, include, but are not limited to a cellular phone, a smart phone, a personal digital assistant, a portable computing device, a navigation device, a tablet, and/or the like or any combination thereof.

The processing and communication electronics 12 may include one or more electronic processors, associated memory, and communication electronics for communicating data (audio, image, text or other information) over the network 14. In particular embodiments, the communication electronics includes electronic receiver, transmitter and/or transceiver electronics for wireless communication of data.

In the embodiment of FIG. 1, the UE 10 is connected for communication in a wireless communication system. The wireless system in FIG. 1 may, for example, be representative of any wireless communication system or network that may be enabled to receive and/or transmit wireless signals. By way of example but not limitation, the wireless system in FIG. 1 may include one or more of a wireless wide area network (WWAN), or a wireless metropolitan area network (WMAN), e.g., Universal Mobile Telecommunications System (UMTS) communication system, Evolution Data Only/Evolution Data Optimized (EVDO) communication system, Long Term Evolution (LTE) communication system, and/or the like.

The UE 10 in FIG. 1 comprises a wireless, mobile telephone that includes processing and communication electronics 12 configured to communicate, through one or more base stations 20, over the network 14. In such embodiments, the network 14 comprises a communication network and associated hardware and software for providing network communication operations. One or more network servers 22 are connected on the network 14, for communicating data with UE 10 and other UEs, and/or with other servers on the network 14.

The base station 20 includes (or is connected to or otherwise associated with) one or more network timers 24. The network timers 24 may be implemented by software, hardware or combinations thereof, associated with the base station 20.

A system according to embodiments of the present invention comprises TCFD processing electronics 16 (and/or processing and communication electronics 12 that includes TCFD processing electronics) configured to carry out a TCFD process, as described herein. A system according to further embodiments of the present invention comprises a UE 10 having TCFD processing electronics 16 (and/or processing and communication electronics 12 that includes TCFD processing electronics) configured to carry out a TCFD process, as described herein. Systems according to yet further embodiments of the present invention also comprises one or more of other devices and components as described with reference to FIG. 1.

2. Operation Examples

In embodiments as shown in FIG. 1, the UE 10 is configured to communicate (receive or receive and transmit) data over the network 14, through radio connections with one or more base stations 20. Data is communicated in packets, where a communication session typically involves the communication of multiple data packets. However, as discussed above, various communication events can result in a radio connection in which a relatively small amount of data (for example, a relatively small number of packets or packets of relatively small size) are transferred.

During a communication session, the UE 10 is controlled, via the processing and communication electronics 12, to switch into a high power state (e.g., CELL_DCH and CELL_FACH) to receive or transmit data packets. The UE 10 remains in the high power state as long as packets are being communicated. As discussed above, if the UE 10 remains in the high power state without communicating packets for a predetermined time period (as determined by the network timer 24), the base station 20 will communicate an instruction to the UE 10 to transition to a dormancy or low power state (e.g., IDLE).

However, the TCFD processing electronics 16, according to embodiments of the present invention, triggers a fast dormancy (transition to a low power state) when the TCFD inactivity timer expires and a certain condition is met. In one embodiment, the certain condition is that the number of packets exchanged thus far in the current radio connection is less than a predefined number N. For example, N may be 10. In other embodiments, N is greater or lower than 10.

In that embodiment, the TCFD inactivity timer 17 is initiated for each packet of the first N packets transferred from the start of a radio connection (communication session). In other words, upon detection of the first packet in the radio connection, the TCFD inactivity timer 17 is started. If a second packet is exchanged before the TCFD inactivity timer expires, then the TCFD inactivity timer 17 is reset upon the detection of the second packet, and so forth up to the first N packets in the radio connection.

If the TCFD inactivity timer 17 expires after any of the N packets, before the next packet in the radio connection is exchanged, then the TCFD processing electronics 16 determines that the radio connection is a "tiny connection" and triggers a fast dormancy process to transition the UE 10 to a low power state. If the TCFD inactivity timer 17 does not expire after any of the first N packets in the radio connection, then the TCFD processing electronics 16 determines that the radio connection is not a "tiny connection" and TCFD processing ends for that radio connection.

Once the TCFD process ends, the communication session continues, but is subject to the control of the longer duration network inactivity timer 24. Thus, in the above embodiment, the TCFD process applies an aggressive TCFD inactivity timer 17 during the first N packets of a radio connection (communication session). If the TCFD inactivity timer 17 did not run out during those first N packets, then it is assumed that the radio connection is not a "tiny connection" and the standard network inactivity timer is applied during the remainder of the radio connection (communication session).

In example embodiments described herein, the TCFD processing electronics 16 triggers a fast dormancy (transition to a low power state). In particular embodiments, the TCFD processing electronics 16 triggers a UMTS fast dormancy feature that is included in the processing and communication electronics 12 of the UE (according to appropriate telecommunication standards). In particular embodiments, the transition to a low power state involves transitioning the UE 10 from a high power state for receiving or transmitting data (such as, but not limited to a Cell_DCH state or a Cell_FACH state) into a lower power state (such as, but not limited to an idle state, e.g., Cell_IDLE state, PCH state or other lower power state), for example, a state where the radio connection is removed while the IP address is kept, or to another state that consumes less power than a state in which the UE 10 communicates (receives or transmits) packets. While embodiments use the UMTS fast dormancy feature included in the UE, other embodiments use other suitable fast dormancy features.

For example, upon the TCFD processing electronics 16 triggering a fast dormancy transition, the UE 10 communicates a request (e.g., a Signaling Connection Release Indication (SCRI)) to the base station 20 to transition to a low power state. The base station 20, in response, sends an authorization to the UE 10, causing the processing and communication electronics 12 to transition the UE 10 into a low power state.

In the above example embodiment, the TCFD processing electronics 16 triggers a fast dormancy (transition to a low power state) when the TCFD inactivity timer 17 expires and the certain condition is met that the number of packets exchanged thus far in the current radio connection is less than a predefined number N. In another example, embodiment, the certain condition is that the maximum packet size exchanged thus far in the current radio connection is less than or equal to a predefined value S. The value S may be any suitable value, such as, but not limited to 100 bytes.

In that embodiment, the TCFD inactivity timer 17 is started for each packet of the radio connection (communication session), as discussed above. However, if the TCFD inactivity time expires during the radio connection, then the TCFD processing electronics 16 determines whether or not the size of each packet exchanged up to that point in the radio connection is equal to or less than S. If the size of each packet exchanged up to that point is equal to or less than S, then the TCFD processing electronics 16 determines that the radio connection is a "tiny connection" and triggers a fast dormancy process to transition the UE 10 to a low power state. If the size of any of the packets exchanged up to that point in the radio connection is greater than S, then it is assumed that the radio connection is not a "tiny connection" and the TCFD process ends.

Again, once the TCFD process ends, the communication session continues, but is subject to the control of the longer duration network inactivity timer 24. Thus, in the above embodiment, the TCFD processing electronics 16 applies an aggressive TCFD inactivity timer until a packet having a packet size greater than S is transferred in the radio connection (communication session). If a packet size greater than S is transferred, then it is assumed that the radio connection is not a "tiny connection" and the standard network inactivity timer 24 is applied during the remainder of the radio connection (communication session).

In further embodiments, the value S is a changeable, programmable parameter. Similarly, in any of the above embodiments, the number N can be a changeable, programmable parameter. In particular embodiments, the value S and/or N is determined, based on network or UE performance criteria and/or other predefined conditions.

For example, the TCFD processing electronics 16 may be configured to provide a different S value and/or different N value for each of a plurality of different geographic locations, such that a different S and/or N value is provided for each different detected geographic location of the UE 10. For example, a plurality of different geographic regions may be respectively associated (e.g., on a one-to-one basis) with a corresponding plurality of different S and/or N values, such that a different S and/or N value is provided for each different geographic region in which the UE 10 may be located.

In the embodiment described herein, the TCFD timer 17 can be set at a fixed value (such as, but not limited to 3 to 5 seconds). Alternatively, in any of those embodiments, the TCFD timer 17 can be changed or adaptively updated, for example, based on certain rules, algorithms or performance criteria.

For example, the TCFD processing electronics 16 and/or TCFD timer 17 may be configured to apply an algorithm or rule-based process to define a TCFD timer value for any of the above-described embodiments, where the TCFD timer value is dependent on one or more predefined conditions.

Example TCFD processes according to embodiments of the present invention may be carried out by the TCFD processing electronics 16 and/or processing and communication electronics 12 that includes TCFD processing electronics 16.

Figure 2:
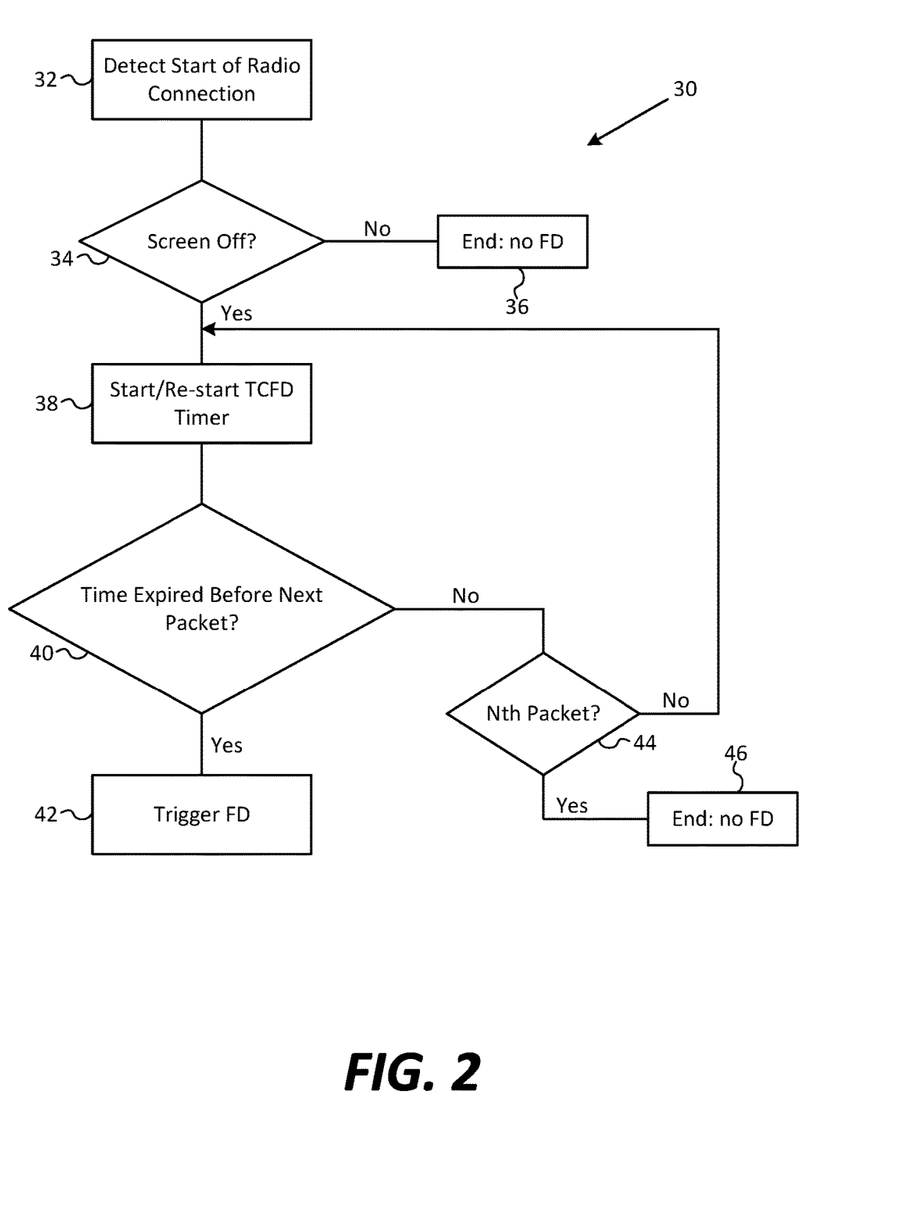
FIG. 2 is a flow chart of a process according to an embodiment of the present invention.

In the flow chart of FIG. 2, the TCFD process 30 begins with (or otherwise include) a detection (at 32) of the start of a radio connection (or a determination that a radio connection has started). In particular embodiments, electronics in the UE (such as, but not limited to, the processing and communication electronics 12 and/or TCFD processing electronics 16) detect (at 32) the start of the radio connection by monitoring or otherwise receiving a signal from the network, indicating that the processing and communication electronics 12 has obtained a radio connection. In other embodiments, other suitable indicators of the start of a radio connection may be employed to determine the detection 32.

In particular embodiments, upon a detection 32 of the start of a radio connection, the process 30 then determines (at 34) whether or not the display screen of the UE 10 (e.g., the display screen associated with the display screen and electronics 18) is turned OFF or ON. In particular embodiments, electronics in the UE (such as, but not limited to, the processing and communication electronics 12 and/or TCFD processing electronics 16) determines (at 34) determines whether or not the display screen is OFF or ON by monitoring or otherwise receiving a signal from a high-level operating system associated with the electronics, where the signal indicates that the display screen is ON (not OFF).

If the determination 34 is that the display screen is not OFF (No), then it is assumed that the user has recently used or is currently using the device and the TCFD process 30 is ended (at 36), with no fast dormancy (i.e., no transition to the low power state). As a result, the UE 10 remains in the high power state and is subject to the longer-duration network inactivity timer during the remainder of the radio connection (communication session).

If the determination 34 is that the display screen is OFF (Yes), then the process 30 proceeds to 38 to start the TCFD inactivity timer 17. In further embodiments, the determination 34 may be eliminated from the process 30, such that the process 30 proceeds from the detection 32 to the start 38 of the TCFD inactivity timer 17, without making a determination 34 regarding the display screen status.

The TCFD inactivity timer 17 is started (at 38). The TCFD inactivity timer 17 times (or otherwise determines the expiration of) a predefined time period (i.e., the TCFD timer period).

After the TCFD inactivity timer 17 is started, a determination is made (at 40) as to whether or not the TCFD inactivity timer 17 expired before the communication of the next packet in the radio connection. If the determination 40 is (Yes) that the TCFD inactivity timer expired before the next packet was communicated, then the fast dormancy process is triggered (at 42) to transition the UE 10 into a low power state, without waiting for the network inactivity timer 24 to expire.

On the other hand, if the determination 40 is (No) that the TCFD inactivity timer did not expire before the next packet was communicated, then the process 30 proceeds to determine (at 44) whether or not the last packet was the Nth packet from the start of the radio communication. If the determination 44 is (Yes) that the last packet was the Nth packet, then the TCFD process 30 is ended (at 46) with no fast dormancy (i.e., no transition to the low power state). As a result, the UE 10 remains in the high power state and is subject to the network inactivity timer during the remainder of the radio connection (communication session).

On the other hand, if the determination 44 is (No) that the last packet was not the Nth packet, then the TCFD process 30 returns to reset the TCFD inactivity timer 38. In that event, the TCFD inactivity timer 38 is restarted (or otherwise accessed), so that a determination can be made (at 40) as to whether or not the predefined time period expired before the communication of the next packet in the radio connection, and the process 30 continues as described above.

As described above, the TCFD inactivity timer 17 is started (at 38) after the detection of the start of a radio connection, and is reset or restarted (again, at 38) for each packet, up to the first N packets, in a radio connection. In such embodiments, the TCFD processing electronics 16 is configured to detect the occurrence of each packet, at least up to the first N packets in a radio connection. In particular embodiments, the detection of a packet is made by monitoring a transmission and reception data buffer associated with the processing and communication electronics 12 and/or TCFD processing electronics 16.

Upon the detection of the packet, the TCFD processing electronics 16 triggers the TCFD inactivity timer 17 to reset and start timing again. In addition, the TCFD processing electronics 16 includes a counter (or accesses a counter associated with the processing and communication electronics 12) to count the number of packets from the start of a radio connection. For example, the TCFD processing electronics 16 may be configured to reset a counter at the beginning of a radio connection and increment the counter (or decrement the counter from N or other preset number), for each detection of a packet. By keeping and accessing a count of the number of packets communicated from the start of the radio connection, the TCFD processing electronics 16 can make a determination 44 as to whether or not the last packet was the Nth packet in the radio connection.

In the further embodiment, in addition to or instead of determining whether or not a TCFD inactivity timer 17 expires within the first N packets, a determination is made as to whether or not the maximum packet size of each packet thus far exchanged in the radio connection is less than or equal to a predefined size S. An example of such a process 50 is described with reference to FIG. 3. In particular embodiments, the TCFD processing electronics 16 (and/or processing and communication electronics 12 that includes TCFD processing electronics 16) is configured to perform a process 30 as described above, a process 50, or a combination of both processes.

Figure 3:
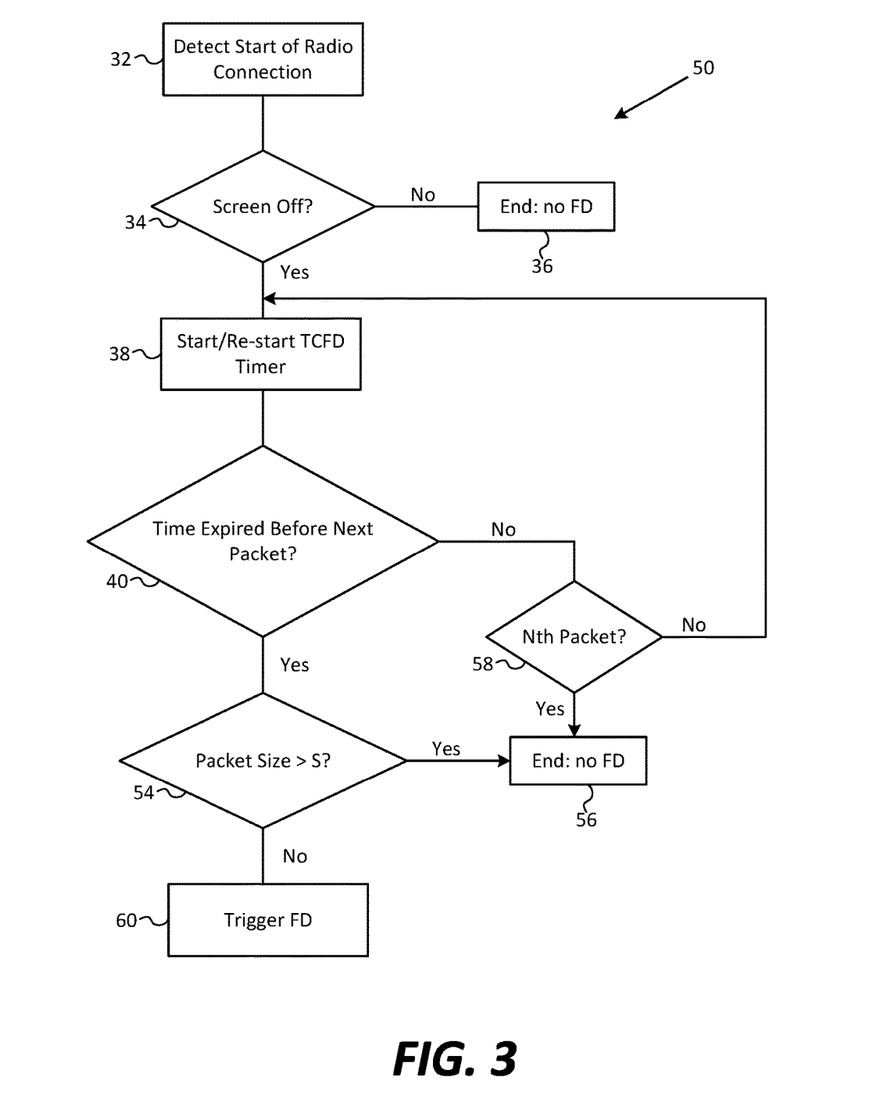
FIG. 3 is a flow chart of a further process according to an embodiment of the present invention.

With reference to FIG. 3, the process 50 starts with the same elements 32, 34 and 38, as described above with respect to the process of FIG. 2. In the process 50, after the start of the radio connection is detected (at 32), packets may be detected in the manner described above or any other suitable manner.

Upon the detection of a packet, the TCFD inactivity timer 17 is started or re-started (at 38). A determination is made (at 40) as to whether or not the TCFD inactivity timer 17 expired before the communication of the next packet in the radio connection. If the determination 40 is (Yes) that the TCFD inactivity timer expired before the next packet was communicated, a further determination (at 54) is made as to whether or not the size of the packet exceeds a predefined threshold size S. In particular embodiments, electronics in the UE 10 (such as, but not limited to the processing and communication electronics 12 and/or TCFD processing electronics 16) is configured to detect the size of a packet by monitoring the change of the data size in the transmission and reception buffer.

If the determination 54 is (Yes) that the size of a packet is greater than a predefined threshold size S, then the TCFD process 50 is ended (at 56) with no fast dormancy (i.e., no transition to the low power state). As a result, the UE 10 remains in the high power state and is subject to the network inactivity timer during the remainder of the radio connection (communication session). On the other hand, if the determination 54 is (No) that the size of a packet is not greater than a predefined threshold size S, then the TCFD process 50 proceeds to trigger fast dormancy (at 60) to transition the UE 10 into a low power state, without waiting for the network inactivity timer 24 to expire.

If the determination 40 is (No) that the TCFD inactivity timer did not expire before the next packet was communicated, then the process 50 proceeds to determine (at 58) whether or not the last packet was the Nth packet from the start of the radio communication. If the determination 58 is (Yes) that the last packet was the Nth packet, then the TCFD process 50 is ended (at 56) with no fast dormancy (i.e., no transition to the low power state). As a result, the UE 10 remains in the high power state and is subject to the network inactivity timer during the remainder of the radio connection (communication session). On the other hand, if the determination 58 is (No) that the last packet was not the Nth packet, then the TCFD process 50 returns to start/re-start TCFD timer (at 38), and the process 50 continues as described above.

Figure 4:
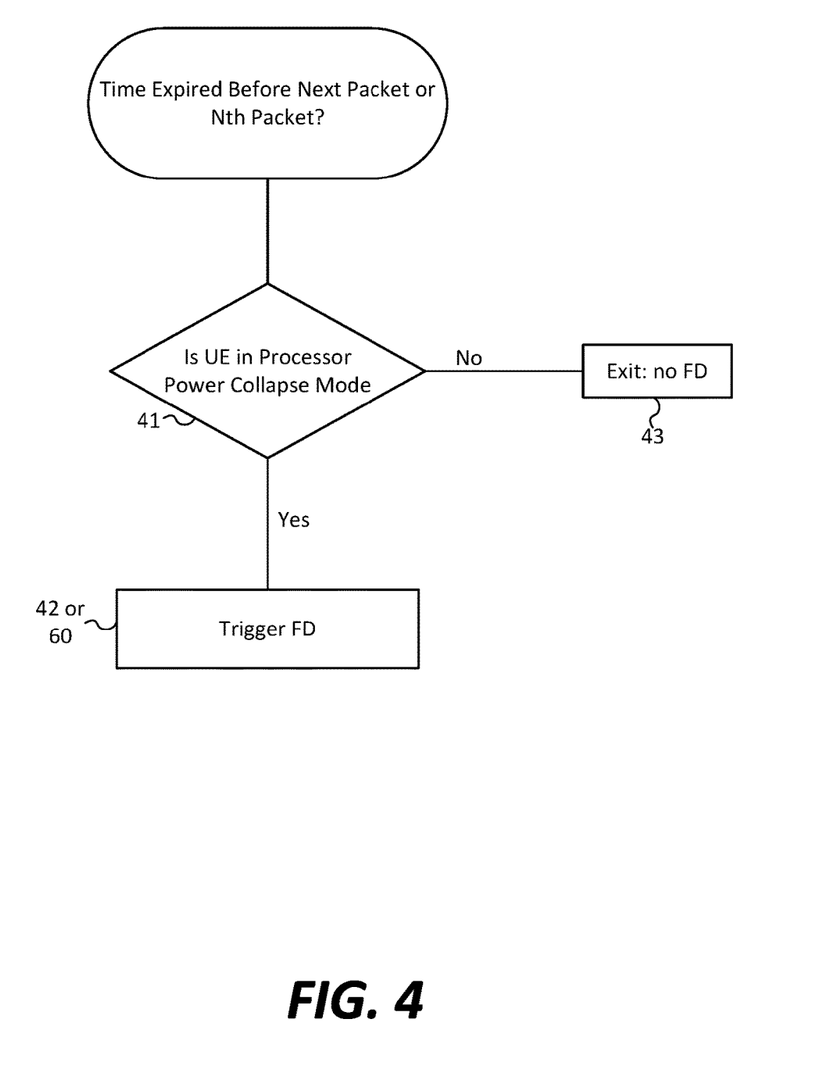
FIG. 4 is a flow chart of a portion of a process according to a further embodiment of the present invention.

In further example embodiments of the TCFD processes described above with respect to FIGS. 2 and 3, the process may include a determination as to whether or not the UE is in an application processor power collapse mode with the display screen OFF. For example, in the embodiments of FIGS. 2 and 3, instead of (or in addition to) the element 34, the TCFD process 30 or 50 may include a determination 41 as to whether or not the UE is in application processor power collapse mode and is in a screen OFF mode. For example, in the TCFD process 30, the determination 41 may occur after a determination 40 of (Yes), and before a trigger 42 of the TCFD fast dormancy process, as shown in FIG. 4. In the TCFD process 50, the determination 41 may occur after a determination 54 of (No), and before a trigger 60 of the TCFD fast dormancy process, also as shown in FIG. 4.

Example TCFD processes and systems as described above are configured to control UE 10 to transition from a high power state to a low power state in response to a determination that a first predefined period of time (determined by the TCFD timer 17) has expired after transfer of a packet and before transfer of a next packet, for the first N packets in a communication session, and to employ a second time period (determined by the network inactivity timer 24) after the first N packets. Further example TCFD processes and systems as described above are alternatively or also configured to control the UE 10 to transition from a high power state to a low power state, in response to a determination that a first predefined period of time (determined by the TCFD timer 17) has expired after transfer of a packet and before transfer of a next packet, and that the size of each packet transferred thus far is not greater than a predefined value S.

A TCFD process as described above may be implemented with processing electronics in the UE 10. Existing or additional processing and related electronics (hardware, software, firmware, and/or combinations thereof) may be employed in the UE 10 to provide a traffic inactivity timer with a suitably aggressive timer period (i.e., a TCFD inactivity timer 17 as described above). Such existing or additional electronics may include a packet counter and/or a packet size detector, depending upon which of the above embodiments is employed.

The TCFD process may be configured to detect existing screen ON/OFF information, to determine whether or not the display screen on the UE is ON or OFF. Similarly, the TCFD process may be configured to detect existing application processor power collapse mode information, to determine whether or not the UE is in an application processor power collapse mode. In particular embodiments, those detection operations are provided by software instructions provided to processing electronics in the UE 10 (for example, the processing and communication electronics 12, discussed above). Accordingly, in particular embodiments, a TCFD system and process may be implemented with minimal or no hardware changes to an existing UE device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

The invention claimed is:

1. A method of controlling a communication device configured to transition from a first power state to a second power state based at least in part on a local inactivity timer, the method comprising:
  operating the communication device in the first power state during a communication session;

sequentially exchanging each of a plurality of packets with another device during the communication session; and transitioning the communication device from the first power state to the second power state in response to a determination that a first time period defined by the local inactivity timer has expired between the sequential exchanging of a pair of the plurality of packets during the communication session and that less than a number N of the plurality of packets have been exchanged prior to the expiration of the first time period, wherein the first time period defined by the local inactivity timer is less than a second time period defined by a network inactivity timer, and wherein the number N is an integer between 2 and 12, inclusive, determined prior to the communication session.

2. The method of claim 1, further comprising:
detecting a connection increase rate and adjusting the number N based on the detected connection increase rate.

3. The method of claim 1, further comprising:
maintaining the communication device in the first power state while the communication device is not in an screen OFF mode.

4. The method of claim 1, further comprising:
maintaining the communication device in the first power state while the communication device is not in an application processor power collapse mode.

5. A communication system for controlling a communication device configured to transition from a first power state to a second power state based at least in part on a local inactivity timer, the communication system comprising:
one or more processors; and
a memory storing instructions that, when executed by the one or more processors, cause the communication device to:
operate the communication device in the first power state during a communication session;
sequentially exchange each of a plurality of packets with another device during the communication session; and
transition the communication device from the first power state to the second power state in response to a determination that a first time period defined by the local inactivity timer has expired between the sequential exchange of a pair of the plurality of packets during the communication session and that less than a number N of the plurality of packets have been exchanged prior to the expiration of the first time period,
wherein the first time period defined by the local inactivity timer is less than a second time period defined by a network inactivity timer, and
wherein the number N is an integer between 2 and 12, inclusive, determined prior to the communication session.

6. The communication system of claim 5, wherein execution of the instructions further causes the communication device to adjust the number N based on a detected connection increase rate.

7. The communication system of claim 5, wherein execution of the instructions further causes the communication device to:
operate in the first power state while the communication device is not in an screen OFF mode; or operate in the first power state while the communication device is not in an application processor power collapse mode.

8. A system of controlling a communication device configured to transition from a first power state to a second power state based at least in part on an inactivity timer, the system comprising:
means for operating the communication device in the first power state during a communication session;
means for sequentially exchanging each of a plurality of packets with another device during the communication session; and
means for transitioning the communication device from the first power state to the second power state in response to a determination that a first time period defined by the local inactivity timer has expired between the sequential exchanging of a pair of the plurality of packets during the communication session and that less than a number N of the plurality of packets have been exchanged prior to the expiration of the first time period,
wherein the first time period defined by the local inactivity timer is less than a second time period defined by a network inactivity timer, and
wherein the number N is an integer between 2 and 12, inclusive, determined prior to the communication session.

9. The system of claim 8, further comprising:
means for determining a connection increase rate and adjusting the number N based on the detected connection increase rate.

10. The system of claim 8, further comprising:
means for maintaining the communication device in the first power state while the communication device is not in an screen OFF mode.

11. The system of claim 8, further comprising:
means for maintaining the communication device in the first power state while the communication device is not in an application processor power collapse mode.

12. A non-transitory computer readable medium comprising instructions that, when executed by one or more processors of a communication device, causes the communication device to transition from a first power state to a second power state based at least in part on an inactivity timer by performing operations comprising:
operating the communication device in the first power state during a communication session;
sequentially exchanging each of a plurality of packets with another device during the communication session; and
transitioning the communication device from the first power state to the second power state in response to a determination that a first time period defined by the local inactivity timer has expired between the sequential exchanging of a pair of the plurality of packets during the communication session and that less than a number N of the plurality of packets have been exchanged prior to the expiration of the first time period,
wherein the first time period defined by the local inactivity timer is less than a second time period defined by a network inactivity timer, and
wherein the number N is an integer between 2 and 12, inclusive, determined prior to the communication session.

* * * * *